United States Patent [19]
Babienko et al.

[11] Patent Number: 5,356,262
[45] Date of Patent: Oct. 18, 1994

[54] HIGH EFFICIENCY MATERIAL HANDLING AND TRANSPORTATION SYSTEM

[75] Inventors: Franklin R. Babienko, Vancouver; Donald C. Jones, Langley, both of Canada

[73] Assignee: Ferguson Glass B.C. Ltd., Richmond, Canada

[21] Appl. No.: 81,692

[22] Filed: Jun. 25, 1993

[30] Foreign Application Priority Data

Apr. 13, 1993 [CA] Canada .................................. 2093892

[51] Int. Cl.⁵ ............................................ B65G 63/00
[52] U.S. Cl. ..................... 414/786; 414/498; 414/390; 414/399; 414/403
[58] Field of Search ............. 414/498, 499, 500, 786, 414/286, 284, 281, 277, 273, 266, 267, 390, 391, 392, 399, 403; 364/478; 254/417, 423

[56] References Cited

U.S. PATENT DOCUMENTS

| | | | |
|---|---|---|---|
| 1,802,220 | 4/1931 | Romine | 414/391 X |
| 4,049,135 | 9/1977 | Glassmeyer | 414/399 X |
| 4,818,171 | 4/1989 | Burkholder | |
| 4,907,935 | 3/1990 | Mankey | |
| 4,915,240 | 4/1990 | Konstant | |
| 4,982,851 | 1/1991 | Konstant | |
| 4,984,962 | 1/1991 | Jarvinen | 414/498 X |

FOREIGN PATENT DOCUMENTS

| | | | |
|---|---|---|---|
| 1781470 | 10/1979 | Fed. Rep. of Germany | 414/284 |
| 136830 | 6/1986 | Japan | 414/399 |
| 1168902 | 10/1969 | United Kingdom | 414/498 |

Primary Examiner—Frank E. Werner
Attorney, Agent, or Firm—Oyen Wiggs Green & Mutala

[57] ABSTRACT

This application relates to a novel process for distributing construction materials from a supply site to a multi-level building site and delivering the materials to elevated floors during construction of the building. A method of delivering a material from a material source to a construction site comprising: loading the material onto a mobile cart; loading the material and the mobile cart onto an adjustable height platform; positioning a flat-decked truck under the platform; positioning the platform on the truck so that it is free of the ground; securing the platform to the truck and driving the truck with platform, cart and material to the construction site; moving the platform until the platform, cart and materials are free of the truck and the platform is free standing; moving the truck from under the platform; lifting the platform with the cart and materials by a lifting device to a desired floor of a building; moving the materials and cart off the platform onto the desired floor; moving the empty cart back onto the platform; lowering the platform to the ground; positioning an empty truck under the platform; positioning the platform until the platform rests on the truck; securing the platform to the truck and driving the truck and platform to the materials site; moving the platform until the platform is free of the truck and is free standing; moving the truck from under the platform; and removing the empty mobile carts from the platform.

10 Claims, 6 Drawing Sheets

HIGH EFFICIENCY MATERIAL HANDLING AND TRANSPORTATION SYSTEM

FIELD OF THE INVENTION

This application relates to a novel process for distributing construction materials from a supply site to a multi-level building site and delivering the materials to elevated floors during construction of the building.

BACKGROUND OF THE INVENTION

In constructing multi-level buildings, it has been commonplace to load materials to be used in the construction of the multi-level building on a transport truck, or the like, or on a pallet which is then placed on the transport truck. The materials are then transported by truck, or the like, to the building site. Once at the building site, the material is unloaded from the truck and raised with a construction elevator or crane. A platform or some load carrying device protrudes from one or more of the floors of the multi-level building under active construction. The elevator or crane then hoists the material off the truck, or from the unloading site if the material has already been unloaded off the truck, to the unloading platform at the specific floor level in the multi-level building. The material is then moved off the platform and distributed and installed as required around the floor level under construction.

A problem with this traditional material handling system is that it is inefficient and prone to delays. For instance, transport trucks may not be readily available at the time that the materials are ready to be loaded onto the truck. At the construction site, the construction elevator or crane may be in active use for other things and not immediately available for unloading the material off the truck at the time the truck arrives at the construction site. Often the construction materials are heavy and it is not possible to readily unload the materials off the truck without the aid of a high powered mechanical device such as a construction elevator or a crane, which may not be immediately available. Dollies, jacks, and the like, can be used but they are not adaptable to all situations. As a result, since time is money in the construction of a building, expensive delays occur.

U.S. Pat. No. 4,907,935, Mankey, issued Mar. 13, 1990, discloses a cargo transporter having a cargo platform, mounted on a frame. The frame is supported by lift assemblies, which are mounted on wheel assemblies. Each lift assembly has a leg having an upper end which supports the frame and a lower end connected to the wheel assembly. Each lift assembly also has a support arm having an upper end pivotally connected to the frame and a lower end pivotally connected to the leg. Each lift assembly also has a hydraulic cylinder and piston rod, mounted between the leg and a bell crank of the support arm for changing the angle between the leg and the support arm, to cause the frame in the cargo platform to move vertically. A plurality of hydraulic cylinders and piston rods are mounted between the frame and the cargo platform for maneuvering the cargo platform relative to the frame.

U.S. Pat. No. 4,915,240, Konstant, issued Apr. 10, 1990, discloses a pallet rack comprising at least one pair of spaced, parallel rails and first and second wheeled carts mounted in rolling relation with the pair of rails, the wheels of first and second carts respectively rolling on the same rolling surfaces. The front wheels of the second cart are positioned between the front and rear wheels of the first cart. As the result of this, the second cart can roll between a first, vertically overlying position relative to the first cart, and a second position where most of the second cart is spaced along the rails from the first cart.

U.S. Pat. No. 4,982,851, Konstant, issued Jan. 8, 1991, discloses a pallet rack comprising at least one pair of spaced, parallel rails and at least one wheeled cart mounted in rolling relation with the pair of rails and defining a load-carrying area. By this invention a cross brace extends between the rails, being positioned to support the bottom of a weak or poorly placed pallet placed on the rails adjacent the front end. The cross brace defines a space adjacent each of the rails to permit the front end of the cart to roll to the front end of the rails between the cross brace and each rail. The cart comprises a pair of wheel-carrying side members positioned parallel to the rails, plus transverse support members connecting the side members. The transverse support members are spaced from the cart front end by a distance sufficient to allow the front end of the cart to roll between the cross brace and each rail.

U.S. Pat. No. 4,818,171, Burkholder, issued Apr. 4, 1989, discloses a pallet transferring arrangement and method for positioning a pallet transfer deck relative to a load transfer station. The pallet transferring arrangement has a jack assembly for elevationally moving a load carrying member between first and second spaced positions relative to a vehicle frame. First and second guide assemblies guide the load carrying member and a supporting arrangement movably supports a pallet transfer deck on the load carrying member for movement in a plane. A plurality of replaceable deck positioning socket members engage a plurality of replaceable deck positioning cone members at the second position of the load carrying member and maintains the pallet transfer deck from movement in the plane. The plurality of deck positioning socket members are free from engagement with the deck positioning cone members at the first position of the load carrying members. A ground engaging foot is connected to and movable with the second guide assembly, and supports the load carrying member at a first position. Thus, pallet transfer deck positioning and stability are achieved in an efficient and economical manner. The pallet transferring arrangement is particularly suited for use on automatic guided vehicles.

SUMMARY OF THE INVENTION

The subject invention is for a process of efficiently distributing construction materials to a multi-level building and raising the materials to specified floor levels during the construction of that building.

A method of delivering materials to a construction site comprising: (a) loading the material onto a mobile cart (b) loading the material and the mobile cart onto an adjustable height platform; (c) positioning a flat-decked truck under the platform; (d) positioning the platform on the truck and ensuring it is free of the ground; (e) securing the platform to the truck and driving the truck to the construction site; (f) moving the platform until the platform, cart and material are free of the truck and the platform is free standing; (g) moving the truck from under the platform; (h) lifting the platform with the cart and material by a lifting means to a desired floor of a building; (i) moving the material and cart off the platform onto the desired floor for unloading; (j) moving an empty cart back onto the platform; (k) lowering the platform to the ground; (1) positioning an empty truck under the platform; (m) positioning the platform until the platform rests on the truck; (n) securing the platform to the truck and driving the truck and platform to the material site; (o) moving the platform until the platform is free of the truck and is free standing; (p) moving the truck from under the platform; and (q) removing the empty carts from the platform.

In the method of the invention, the material can be first loaded onto a small platform which is then loaded onto the mobile cart. There can be a plurality of carts. The platform can have adjustable height legs. The cart can have wheels.

A trailer instead of a truck can be positioned under the large elevated platform when it is free standing on the ground. The lifting means can be a construction crane. The adjustable height legs can be telescoping legs. The legs can be hydraulically, electrically, mechanically or manually powered.

The invention also pertains to a platform for use with a transporting vehicle in transporting materials to a construction site comprising: (a) a broad flat horizontal surface adapted to carry at least one mobile cart; (b) at least three vertical legs which are secured to the surface and are of adjustable height; and (c) means for retracting or extending the legs, or lifting or lowering the transporting vehicle.

The platform can have at least four legs. The legs can be telescoped. The height of the legs can be controlled with hydraulic, electrical, mechanical or manual force.

BRIEF DESCRIPTION OF THE DRAWINGS

In drawings which illustrate specific embodiments of the invention, but which should not be construed as restricting the spirit or scope of the invention in any way.

DETAILED DESCRIPTION OF SPECIFIC EMBODIMENTS OF THE INVENTION

The subject invention pertains to a methodology or process of distributing construction materials from a source to a multi-level building during the construction of that building. The method of the invention includes a number of procedural steps which will be discussed in the following description in relation to the drawings.

Figure 1:
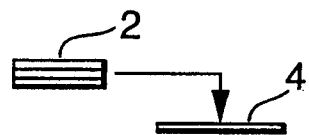
FIG. 1 illustrates a schematic side view of construction materials being loaded onto a small platform.

Referring to FIG. 1, the materials 2 to be delivered to the construction site are loaded onto a platform 4. FIG. 1 illustrates one platform but a number of materials 2 and platforms 4 can be involved.

Figure 2:
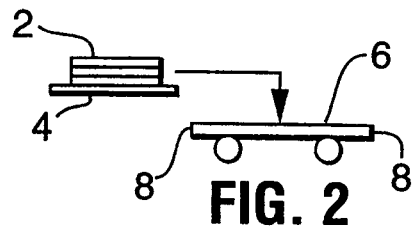
FIG. 2 illustrates a schematic side view of a platform being placed on a wheeled cart.

As seen in FIG. 2, the materials 2 and platforms 4 are placed onto a cart 6. The cart 6 has wheels 8. While FIG. 2 illustrates only one cart 6, several carts may be involved. In some cases, as need be, the materials 2 to be delivered may be placed directly onto the wheeled carts 6 without the platforms 4.

Figure 3:
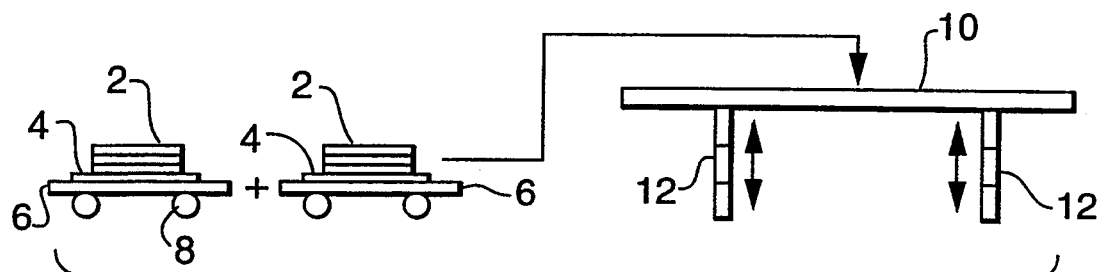
FIG. 3 illustrates a schematic side view of a multi-wheeled cart, carrying construction materials, being loaded onto a large elevated platform which has adjustable height legs.
Figure 4:
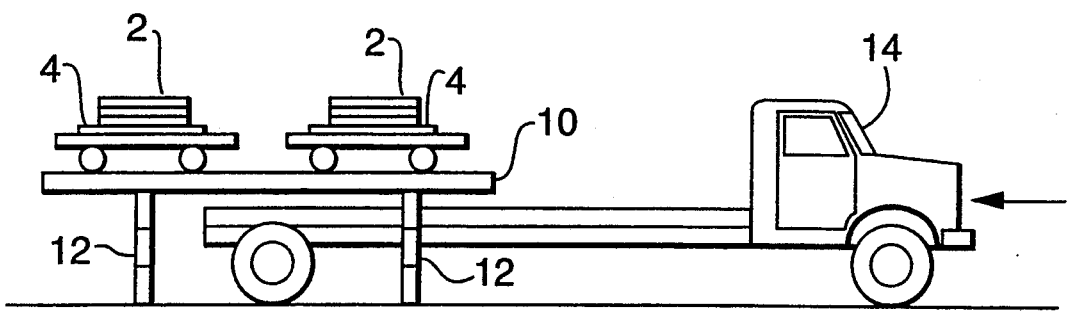
FIG. 4 illustrates a schematic side view of a truck being positioned under the large elevated platform, with the carts and materials on the large platform.
Figure 5:
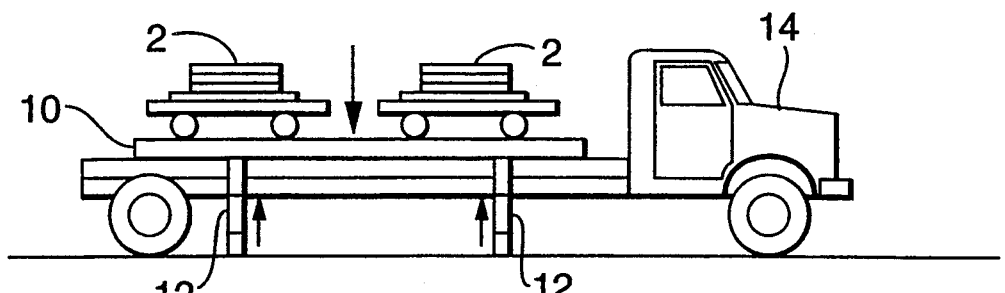
FIG. 5 illustrates a schematic side view of the large elevated platform being lowered onto the truck.

Referring to FIG. 3, several wheeled carts 6, with the materials 2 to be delivered to the construction site, are loaded onto a large elevated platform 10 which stands by itself (on the ground) on adjustable height legs 12. FIG. 3 illustrates only two carts 6. However, more can be used. Once the carts 6 are loaded on the platform 10, a flat-decked truck 14, or trailer, if need be, is positioned under the large elevated platform 10, as seen in FIG. 4.

The adjustable legs 12 of the large elevated platform 10 are retracted until the large elevated platform 10 rests on the truck 14 (or trailer if a trailer is used). This movement is indicated by arrows. Alternatively, the height of the truck can be raised to contact the platform.

Figure 6:
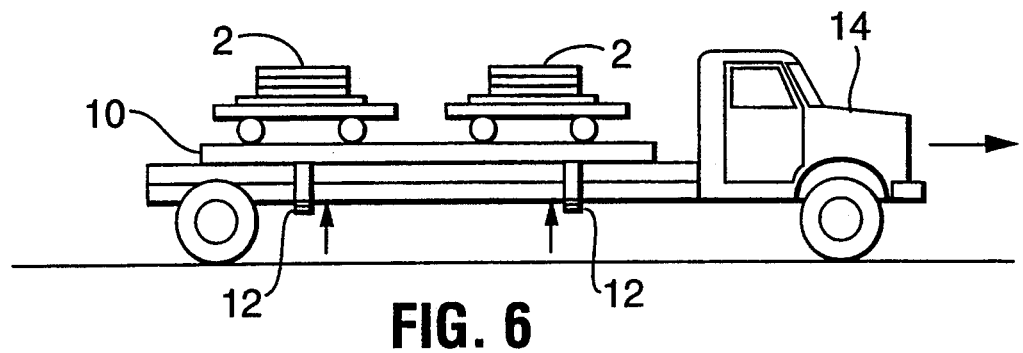
FIG. 6 illustrates a schematic side view of the platform, with raised legs, carts and materials being driven to the construction.

After securing the large elevated platform 10 to the truck 14 (or trailer), and raising the adjustable legs 12, the truck 14 and platform 10 are driven, or towed, to the construction site, as seen in FIG. 6.

Figure 7:
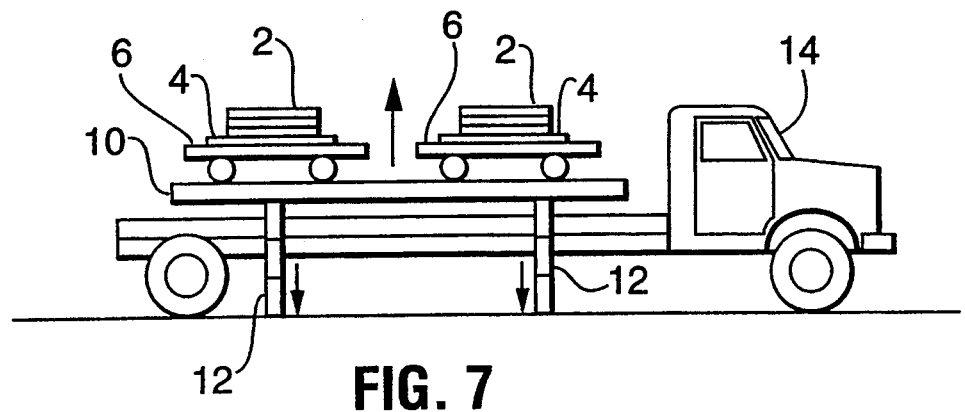
FIG. 7 illustrates a schematic side view of the truck after it has arrived at the construction site and the large elevated platform with carts and materials is raised free of the truck on the adjustable height legs.

At the construction site, the vertical, adjustable legs 12 of the large elevated platform 10 are extended until the platform 10 is raised free of the truck 14 (or trailer) and is free standing and self supporting. This is illustrated in FIG. 7.

Figure 8:
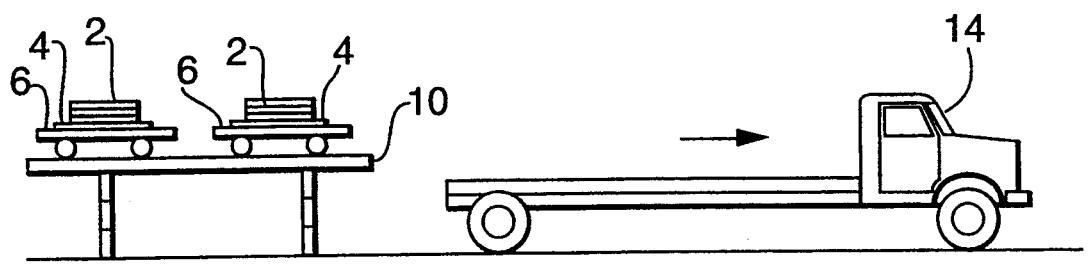
FIG. 8 illustrates a schematic side view of the truck being driven away from under the elevated platform which is raised on its extended legs.

The truck 14 (or trailer) is then pulled away leaving the large elevated platform 10 standing on its extended legs 12. This can be seen in FIG. 8. The arrow indicates the truck being driven away.

Figure 9:
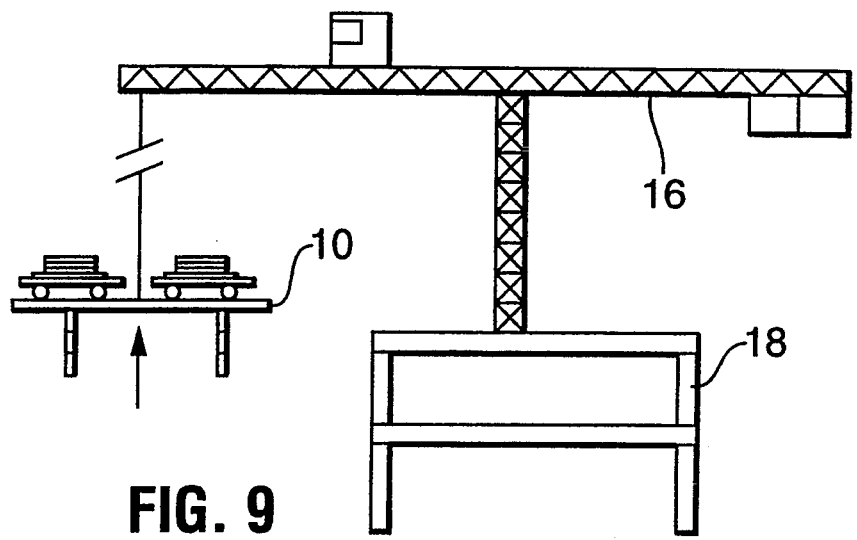
FIG. 9 illustrates a schematic side view of a construction crane lifting the large elevated platform to a desired floor of a multi-level building.

At a convenient time, and referring to FIG. 9, a construction crane 16 lifts the large elevated platform 10 to a desired floor of a building 18. In some cases, if the truck 14 or trailer is not immediately needed elsewhere, or the crane 16 is immediately available, the large elevated platform 10 can be lifted directly off the truck 14, or trailer, without first removing the truck or trailer from under the platform 10.

Figure 10:
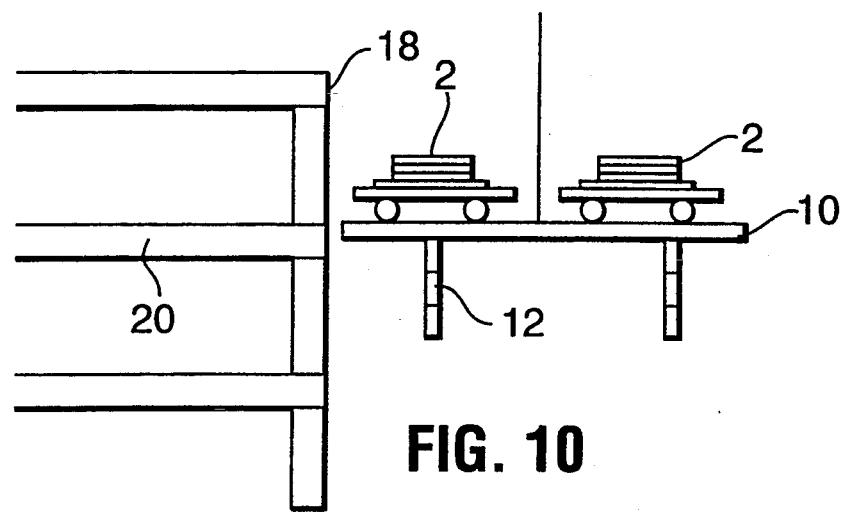
FIG. 10 illustrates a schematic side view of the large elevated platform having been hoisted to the edge of a floor of the multi-level building by the crane.

At the desired floor 20 of the building 18, as illustrated in FIG. 10, the large elevated platform 10 is brought to the edge of the floor 20 by the crane (not shown) in such a manner that the top surface of the large elevated platform 10 is approximately level with the top surface of the floor 20.

Figure 11:
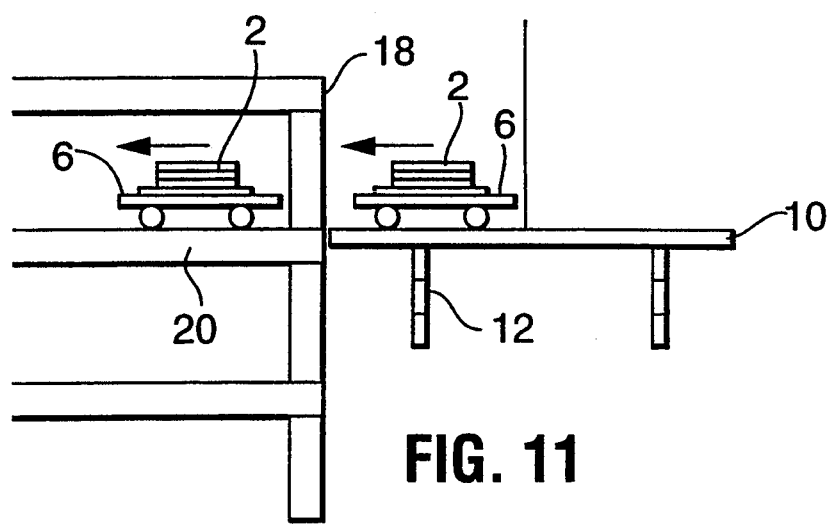
FIG. 11 illustrates a schematic side view of the wheeled carts being rolled off the elevated platform onto a designated floor of the building.

Referring to FIG. 11, the crane continues to hold the large elevated platform 10 at the edge of the floor 20. The large elevated platform 10 is not unloaded onto the floor 20. Instead, the wheeled carts 6, complete with the materials 2 to be delivered (and optionally, the small platforms 4), are then rolled off the large elevated platform 10 directly onto the floor 20. The materials 2 can be unloaded at any convenient time.

Figure 12:
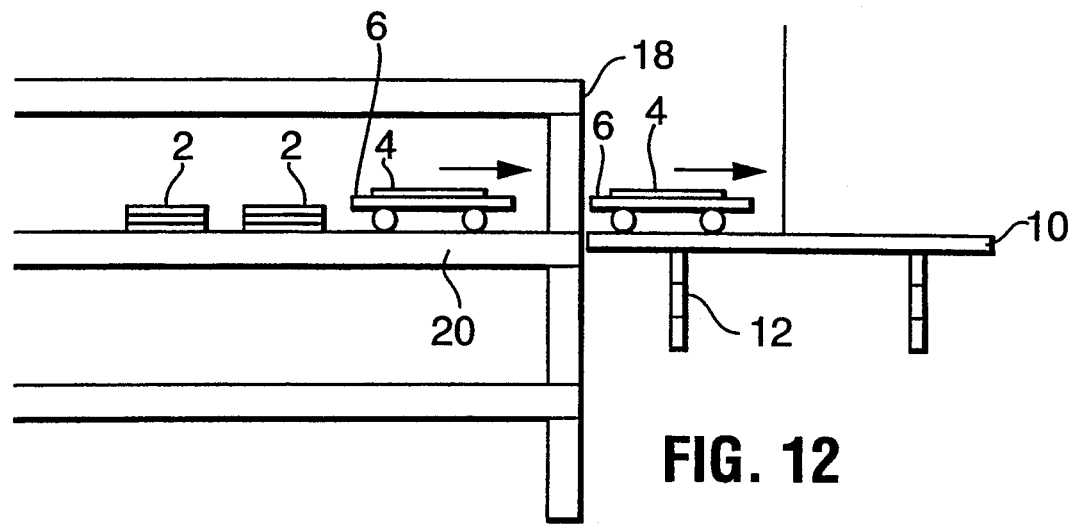
FIG. 12 illustrates a schematic side view of the unloaded wheeled carts being rolled from the designated floor into the elevated platform.

FIG. 12 illustrates a schematic side view of the unloaded wheeled carts 6 being rolled from the designated floor into the elevated platform 10.

Figure 13:
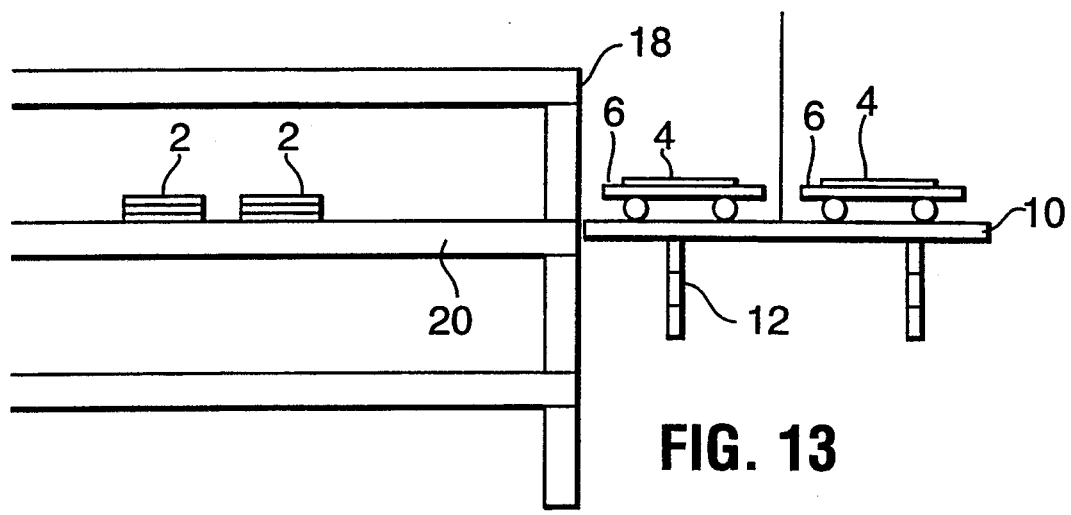
FIG. 13 illustrates a schematic side view of the unloaded wheeled carts moved onto the large elevated platform after being emptied.

Referring to FIG. 13, empty wheeled carts 6 (with or without small platforms 4) may then be rolled back on to the large elevated platform 10 while it is still hanging from the crane 16 at the edge of the floor 20.

Figure 14:
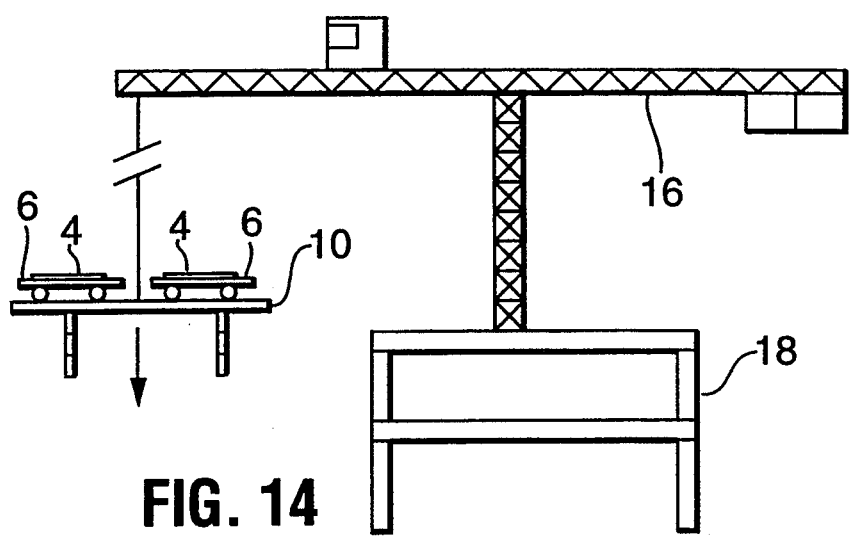
FIG. 14 illustrates a schematic side view of the elevated platform with the empty wheeled carts thereon being lowered to the ground.

Once the platform 10 is reloaded with the carts 6, the crane 16, as seen in FIG. 14, moves the large elevated platform 10 to the ground to rest on the extended legs 12 or place it directly onto an empty truck 14, or trailer, as the case may be, if an empty truck or trailer is available. If not, the platform 10 is placed on the ground.

Figure 15:
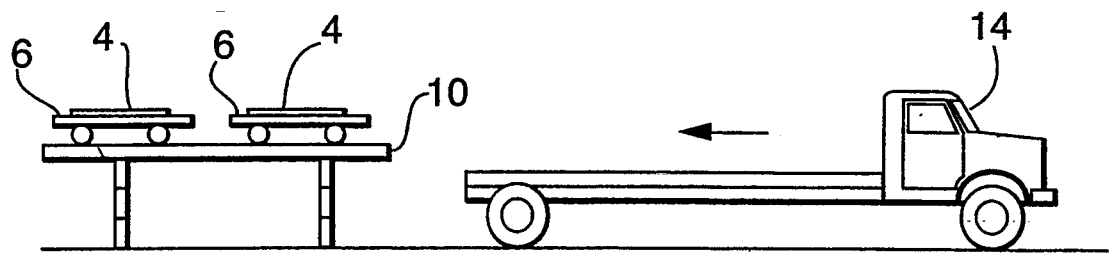
FIG. 15 illustrates a schematic view of the truck positioned to be driven under the elevated platform.

FIG. 15 illustrates a schematic view of the truck 14 positioned to be driven under the elevated platform 10.

Figure 16:
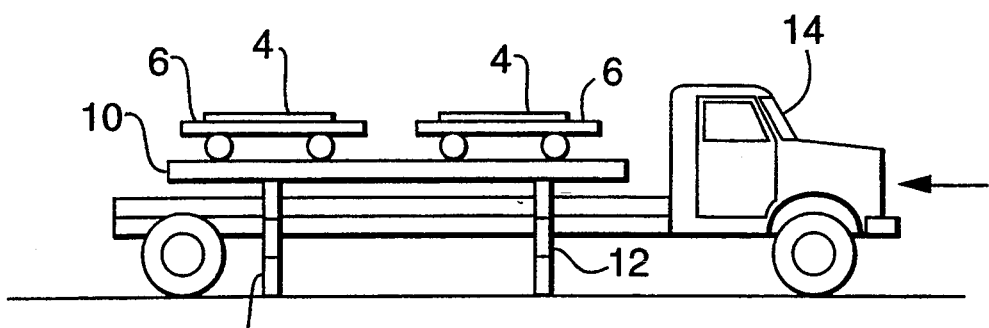
FIG. 16 illustrates a schematic side view of an empty truck positioned under the large elevated platform which is standing on extended legs.

If the large elevated platform 10 is positioned on the ground, an empty truck 14, or trailer, is positioned under the platform 10, when the truck 14 is free. This is illustrated in FIG. 16.

Figure 17:
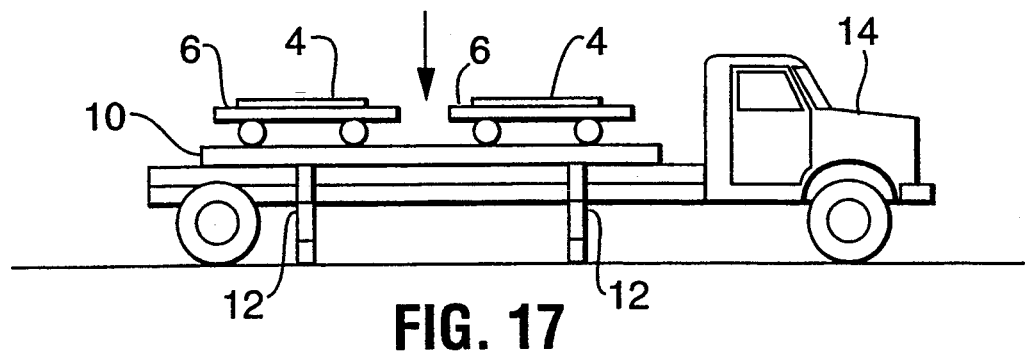
FIG. 17 illustrates a schematic side view of the large elevated platform and empty carts being lowered onto the flat bed of the truck.
Figure 18:
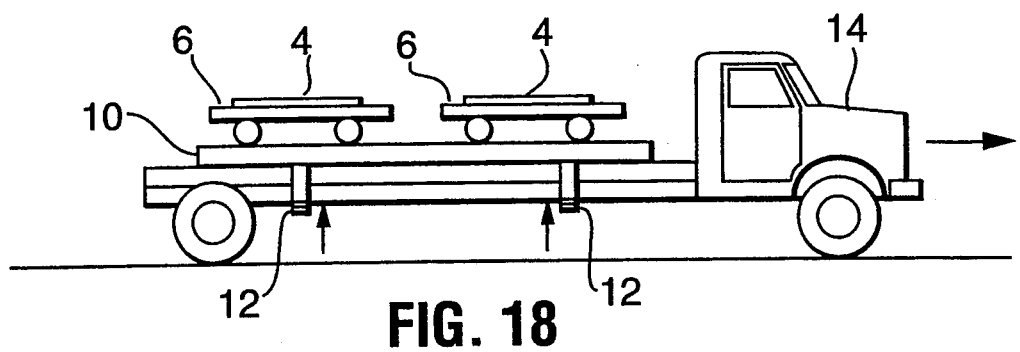
FIG. 18 illustrates a schematic side view of the large elevated platform and empty carts, with the legs of the large platform raised, being driven back to the materials supply site.

As seen in FIG. 17, the height adjustable legs 12 of the large elevated platform 10 are retracted until the large elevated platform 10 rests on the truck 14 (or trailer, if one is used). After securing the large elevated platform 10 to the truck (or trailer), and raising the adjustable legs 12, the truck 14 and platform 10 are driven or towed to where the platform 10 can be reloaded with more materials 2 to be delivered to the construction site. This is illustrated in FIG. 18.

Figure 19:
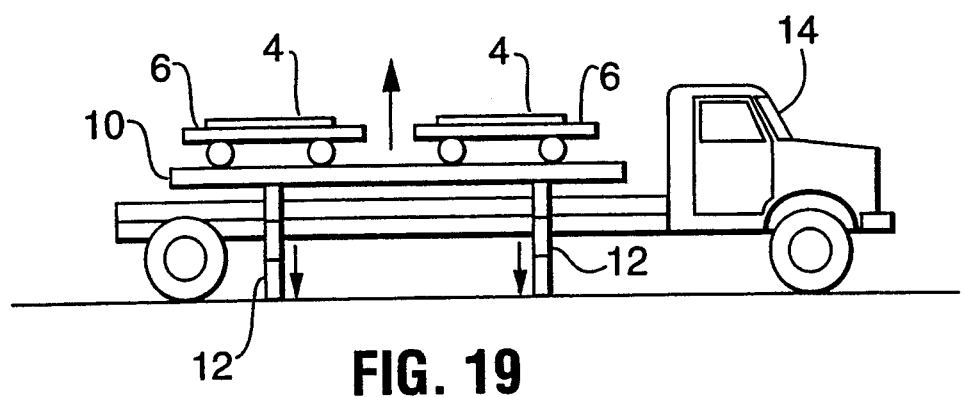
FIG. 19 illustrates a schematic side view of the large elevated platform after it has been returned to the construction material supply site, and the platform with empty carts is being raised off the bed of the truck by extending the legs.

After the truck 14 and platform 10 arrive at the location where the platform 10 is to be reloaded, the height adjustable legs 12 of the large elevated platform 10 are extended until the large elevated platform 10 is raised free of the truck 14 (or trailer) and is free standing and self supporting. Alternatively, if possible, the height of the truck 14 can be lowered. The key is to have the platform 10 clear of the truck 14. This procedure is illustrated in FIG. 19. FIG. 19 does not show platforms 4. In certain situations, the platforms 4 may not be used. The materials 2 may be placed directly on the wheeled cart 6.

Figure 20:
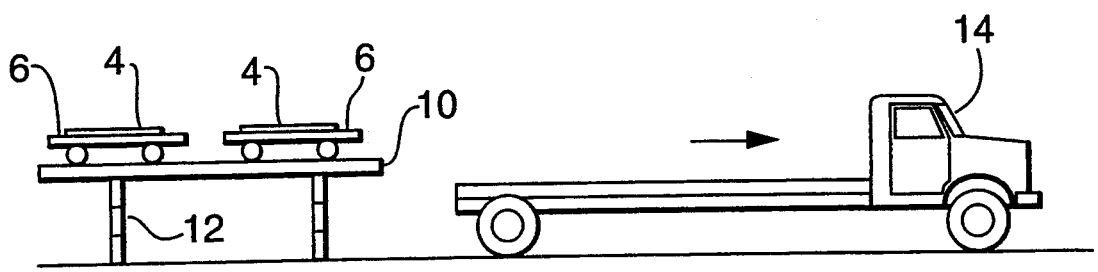
FIG. 20 illustrates a schematic side view of the truck after it has been driven from under the raised large platform.
Figure 21:
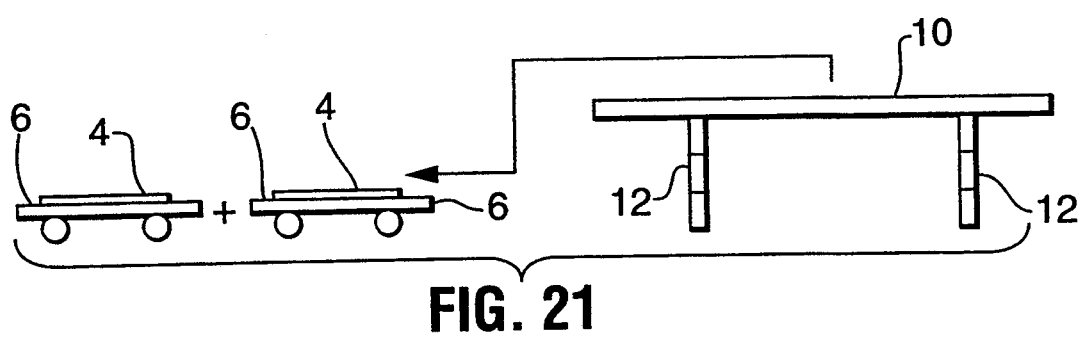
FIG. 21 illustrates a schematic side view of empty wheeled carts being unloaded from the elevated platform ready to be reloaded with material, and thereby repeating the cycle, as illustrated in FIGS. 1 and 2.

The truck 14, or trailer, can be pulled away leaving the large elevated platform 10 standing on its extended legs 12, as shown in FIG. 20. The empty wheeled carts 6 (with or without the small platforms 4) are then removed from the large elevated platform 10 as shown in FIG. 21.

The wheeled carts 6 are then reloaded with material 2 alone or with small platforms 4. They are then loaded on the large elevated platform 10 and the process is repeated, as illustrated previously in FIGS. 1, 2 and 3, and as discussed above.

Depending on the rate of production and specific requirements, this process may involve the use of one or more of any one of the following: small platforms 4, wheeled dollies 6, large elevated platforms 10, and trucks 14, or trailers, which can optionally be of adjustable height or have means for lowering or raising the bed of the truck.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of delivering a material from a material source to a construction site comprising:
 (a) loading the material onto a mobile cart;
 (b) loading the material and the mobile cart onto an adjustable height platform;
 (c) positioning a flat-decked truck under the platform;
 (d) positioning the platform on the truck so that it is free of the ground;
 (e) securing the platform to the truck and driving the truck with platform, cart and material to the construction site;
 (f) moving the platform until the platform, cart and materials are free of the truck and the platform is free standing;
 (g) moving the truck from under the platform;
 (h) lifting the platform with the cart and materials by a lifting means to a desired floor of a building;
 (i) moving the materials and cart off the platform onto the desired floor;
 (j) moving the empty cart back onto the platform;
 (k) lowering the platform to the ground;
 (l) positioning an empty truck under the platform;
 (m) positioning the platform until the platform rests on the truck;
 (n) securing the platform to the truck and driving the truck and platform to the materials site;
 (o) moving the platform until the platform is free of the truck and is free standing;
 (p) moving the truck from under the platform; and
 (q) removing the empty mobile carts from the platform.

2. A method as claimed in claim 1 wherein the materials are first loaded onto a small platform which is then unloaded onto the mobile cart.

3. A method as claimed in claim 1 wherein there are a plurality of carts.

4. A method as claimed in claim 1 wherein a trailer instead of a truck is positioned under the large elevated platform when it is free standing on the ground.

5. A method as claimed in claim 1 wherein the lifting means is a construction crane.

6. A method as claimed in claim 1 wherein the platform has adjustable height legs.

7. A method as claimed in claim 6 wherein the adjustable height legs are telescoping.

8. A method as claimed in claim 1 wherein the adjustable height legs are powered by any one of hydraulic, electrical, mechanical or manual means.

9. A method as claimed in claim 1 wherein the truck can be adjusted in height relative to the platform.

10. A method as claimed in claim 1 wherein the carts have wheels.

* * * * *